(12) United States Patent
Clarke

(10) Patent No.: US 9,304,372 B2
(45) Date of Patent: Apr. 5, 2016

(54) OPTICAL ELEMENT WITH SUB ELEMENTS AND AN ADDRESSABLE MASK

(75) Inventor: Roger Clarke, Royston (GB)

(73) Assignee: The Technology Partnership PLC, Royston, Herts (GB)

( * ) Notice: Subject to any disclaimer, the term of this patent is extended or adjusted under 35 U.S.C. 154(b) by 640 days.

(21) Appl. No.: 13/640,019

(22) PCT Filed: Apr. 8, 2011

(86) PCT No.: PCT/GB2011/000550
§ 371 (c)(1),
(2), (4) Date: Dec. 5, 2012

(87) PCT Pub. No.: WO2011/124896
PCT Pub. Date: Oct. 13, 2011

(65) Prior Publication Data
US 2013/0201543 A1   Aug. 8, 2013

(30) Foreign Application Priority Data

Apr. 9, 2010   (GB) .................................. 1005965.7

(51) Int. Cl.
*G02F 1/01*   (2006.01)
*G02F 1/29*   (2006.01)
*G02B 3/14*   (2006.01)
*G02F 1/23*   (2006.01)

(52) U.S. Cl.
CPC   *G02F 1/292* (2013.01); *G02B 3/14* (2013.01); *G02F 1/23* (2013.01); *G02F 2001/294* (2013.01)

(58) Field of Classification Search
USPC .................................. 359/237, 240, 298, 900
See application file for complete search history.

(56) References Cited

U.S. PATENT DOCUMENTS

| 5,565,668 A | 10/1996 | Reddersen et al. |
| 2005/0073739 A1 | 4/2005 | Meredith et al. |

FOREIGN PATENT DOCUMENTS

EP   0551984 A1   7/1993

*Primary Examiner* — Jack Dinh
(74) *Attorney, Agent, or Firm* — Lowe Graham Jones PLLC

(57) ABSTRACT

A light modulation device comprising an optical element and at least one addressable mask disposed adjacent to the optical element. The optical element comprises at least two sub-elements, each of the at least two sub-elements having at least one optical characteristic wherein at least one optical characteristic of one sub-element is discrete from at least one optical characteristic of another sub-element. The mask comprises at least two regions corresponding to the at least two sub-elements, each of the at least two regions being individually addressable to enable its corresponding sub-element to be light transmitting.

21 Claims, 6 Drawing Sheets

| Lens type/chromatic dispersion at 14° incidence angle (μm at detector) | Blue | Green | Red |
|---|---|---|---|
| Design 1: Standard double Guass: SD stop DS | +5 | 0 | 0 |
| Design 2: SD stop SS | +200 | 0 | -150 |
| Design 3: SS stop SS | +50 | 0 | -50 |
| Design 4: S stop D | +150 | 0 | -250 |

OPTICAL ELEMENT WITH SUB ELEMENTS AND AN ADDRESSABLE MASK

PRIORITY CLAIM

This application is a §371 National Stage Application of International Application No. PCT/GB2011/000550, filed Apr. 8, 2011, and entitled "OPTICAL ELEMENT WITH SUB ELEMENTS AND AN ADDRESSABLE MASK," which is an International Stage Filing of GB Application No. 1005965.7, filed Apr. 9, 2010, and entitled "OPTICAL DEVICE." Accordingly, the present application claims priority to and the benefit of the filing dates of International Application No. PCT/GB2011/000550, and GB Application No. 1005965.7, which are incorporated herein by reference in their entireties.

The present invention relates to an optical device and in particular to an optical lens with variable optical properties.

There have been many attempts to produce variable focus lenses. Existing variable focus lenses are either continuously variable or switchable between fixed focal lengths.

Continuously variable lenses are usually operated by deforming their shape, by use of something such as a fluid surface. Applying a voltage to such systems can change the shape of the interface between conducting and non-conducting fluids. However, there are many drawbacks of such systems. For example, the lenses must be small enough so that gravity does not become significant, the switching speeds are limited by the physical movement of fluids, and the shape of the interface cannot be an arbitrary desired shape.

Some continuously variable lenses have also been constructed by changing the volume of fluid within a structure bound by a flexible membrane. However, the speed of change of such systems is limited by fluid velocity. Furthermore, the optical power is limited by the stretchable membrane and the optical quality is severely limited by the shape of the stretchable membrane.

Other existing continuously variable lenses generally require the physical movement of physical matter in a system, such as the boundary of fluids or the position of a lens, to generate a variable optical power. These technologies are therefore limited in switching time, and generally have limited tunability of the shape of the optical profile because of the physical restraints involved. Furthermore, in any type of continuously variable lens, the focal length must change continuously between one desired focal length and another. This means that jumping between widely varying focal lengths without going through intermediate values is impossible.

The alternative to using fluid lenses is to move two lenses with respect to each other to produce an effective lens with a focal length that is dependent on the distance between the lenses. However, this requires an actuator (such as a motor or piezoelectric device) to physically move the lenses, which limits the switching speed to the capabilities of the actuator driving the mass of a lens back and forth.

In contrast to continuously variable lenses, switchable lenses are generally switchable between two optical powers (with the resulting switching lens having a small numerical aperture i.e. low angles of light ray deviation). Existing switchable lenses include liquid crystal switchable lenses, wherein a diffractive element is substantially hidden or visible to both polarisations of light depending on the voltage applied to a chiral liquid crystal (LC) layer present at the diffractive surface. However, such systems are limited by the residual birefringence of the LC. Therefore exact index matching in the off state is impossible and the lenses suffer from haze clearing due to LC boundaries forming over a timescale of approximately 100 ms. Furthermore, such lenses are only capable of switching between two optical powers and the lenses are necessarily diffractive to keep the liquid crystal depth to approximately 3-4 μm (ie a high dispersion optical device).

LC lenses not employing a chiral dopant may be used to produce polarisation dependent lenses, but two of these are typically needed to address unpolarised light, and are also typically restricted to two focal length states for fast switching times and optical quality. The depth of the liquid crystal determines the switching time and driving voltage of such devices, therefore these devices are typically restricted to diffractive structure devices or small numerical aperture refractive devices to reduce the LC depth for an appropriately fast switching time.

Current switching lenses also include calcite lenses, wherein two different refractive indices are present along two optical axes in the calcite crystal so that there are two focal lengths present, depending on the polarisation of the incoming light. Therefore changing the polarisation of the incoming light switches the power of the lens with the switching speed being as fast as the speed at which polarisation can be changed. However, such calcite lenses are very expensive and the change in the obtainable focal length is limited.

Switchable lenses changing between multiple focal lengths are preferred over continuously variable lenses in many applications. For example, true 3D spectacles require at least 4 depth planes to simulate an environment, in which case a lens that is able to switch between 4 focal lengths at high speed (so that the eye cannot detect the switching) is very advantageous. In most applications it is therefore preferable to have a higher number of focal lengths available.

Other devices include four quadrant lenses comprising split lenses in which quadrants of four lenses have slightly different focal lengths. In this arrangement, four images are imaged onto the four quadrants of the detector such that they are not overlapping.

In any of the above technologies, however, the switching speed is the main limitation, especially when applications require speeds of >100 Hz. Accordingly, one aim of the present invention is to provide a switchable multi-focal lens having a high switching speed (>100 Hz).

According to the present invention there is provided a light modulation device comprising an optical element and at least one addressable mask disposed adjacent to the optical element wherein the optical element comprises at least two sub-elements, each of the at least two sub-elements having at least one optical characteristic wherein at least one optical characteristic of one sub-element is discrete from at least one optical characteristic of another sub-element and wherein the mask comprises at least two regions corresponding to the at least two sub-elements, each of the at least two regions being individually addressable, in use, to enable its corresponding sub-element to be light transmitting.

According to the present invention there is also provided a light modulation method comprising the steps of:

directing light through an optical element comprising at least two sub-elements, each of the at least two sub-elements having at least one optical characteristic wherein at least one optical characteristic of one sub-element is discrete from at least one optical characteristic of another sub-element;

disposing an addressable mask adjacent to the optical element, wherein the mask comprises at least two regions corresponding to the at least two sub-elements; and individually addressing the at least two regions to enable their corresponding sub-elements to be light transmitting.

Therefore, the switchable lens application according to the present invention provides an extremely flexible, switchable lens which enables high-speed switching between different powers. The addressable mask may be used to switch on and off areas of an otherwise solid state lens.

The switchable lens according to the invention is provided with spatially separated regions of different focal lengths across the lens. Therefore, improved switching speed is achieved by employing regions of different focal lengths already present in the lens, rather than modifying a physical boundary or object.

In the present system, the images are overlapping on the detector and therefore the entire area of the detector is used. The active mask adjacent to the split lenses enables fast switching between each one sub-lens.

A switching mask is a much easier component to use at high speed, for example a black/white LC display (which works using crossed or uncrossed polarisers with switching times of approximately 5 ms), a polymer dispersed liquid crystal device (PDLC) which works in a similar way but with switching times of ~150 ms (see MeadlowLark Optics) or a switching light valve (for example, a liquid gallium switching light valve with a switching time of 0.5 ms).

Since the lens is made up of multiple elements which are chosen to be on or off depending on the state of the switchable mask, it is not limited to elements that change the focal length. The elements may be chosen to perform any desired optical function, including diffractive elements, Fresnel lens elements, aspheric lens elements, prism elements, mirror elements, colour filters, optical coatings, birefringent elements, polarising elements, polarisation changing elements, or switching elements (using LCs or fluid lenses themselves as elements, which can be tuned on-the-fly but at lower switching rates). Furthermore, any combinations of the above elements are possible.

Furthermore, one may combine two devices according to the present invention in series to make lenses that switch between a larger number of focal lengths, or provide more optical functions such as, for example, a high-zoom switchable lens.

According to the present invention, the sub-elements which are light transmitting are in optical communication, being part of a single optical element (a single lens, prism or diffractive element, for example), rather than acting as individual, whole optical elements (for example, whole lenses) themselves. In other words, for the example of a simple lens, the sub-elements which are light transmitting have only one common optical axis which leads to all images being formed at the same point. Advantageously, the optical element (a single lens, for example) may operate even though large portions of it (comprising several sub-elements) are obscured by the mask.

The present invention will now be described with reference to the accompanying drawings in which.

Figure 1:
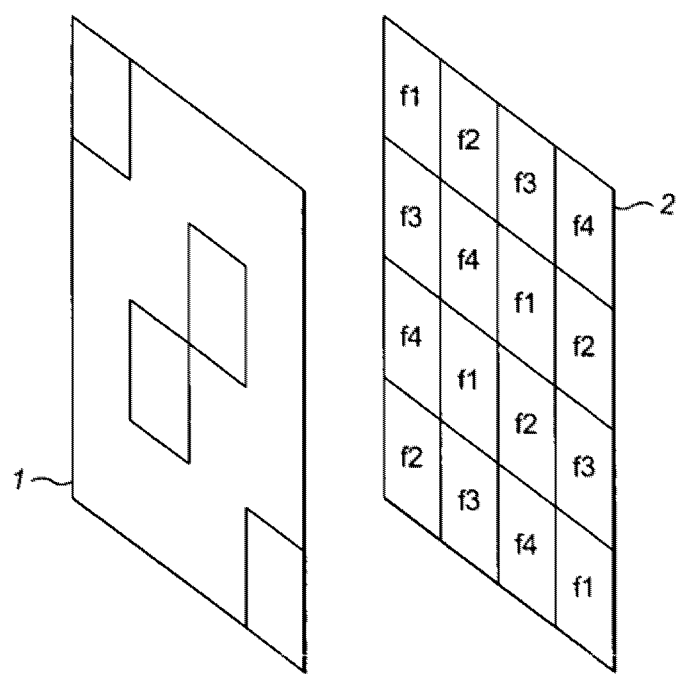
FIG. 1 is a schematic representation of an optical device according to the present invention.

A switchable optical power device according to the invention is represented in FIG. 1. The device comprises a mask 1 such as a binary LC mask and a lens element 2 comprising multi-focal lens facets (f1-f4), the lens area being divided into sub-areas (f1-f4). Alternatively, facets f1-f4 in FIG. 1, may represent different filter colours, as will be described in more detail below. The binary mask 1 may be switched on and off to switch the focal length of the lens 2. In this example, the focal length of the lens 2 is controlled by addressing facets having the same focal length at any one time. It will be appreciated however that the focal length of lens 2 may be changed by addressing any facets of the lens 2. Instead of a binary mask 1, to assist software analysis, one may employ for example masks 1 arranged to fade between one focal length and another.

A low resolution LCD device can be used as the binary mask 1. The switchable mask 1 may be positioned immediately before or after the lens 2 and allows different areas of the lens 2 to become transmitting. This changes the effective focal length of the light passing through the whole lens 2, by effectively rejecting all light not at the right focal length.

The example shown in FIG. 1 includes 4×4 sub-areas of the lens 2 of equal size. Each lens sub-area (f1-f4) contains a focal length lens profile. It will be appreciated however that any number N of sub-areas of varying sizes may be chosen in other applications.

The divided lens structure may be diamond machined using appropriate equipment by a person skilled in the art, for example using a Nanotech 250UPL diamond turning machine with a Nanotech fast tool servo (NFTS-6000) system. Diamond machining of a master allows for variation of tool depth with machining angle in order to allow multiple facets to be machined in a single master. Alternatively, diamond machining may be a ball-end milling type operation. In this method, the facets are machined into the master via a rotating tip plunged into the master and moved around on the surface to make the final lens profile.

Multiple replicas of the master may be produced. The lens may then be fabricated by injection molding, casting, or embossing from the master or master replicas.

Diamond machining of sub-masters is also possible. In this method, each sub-master represents a separate lens/optical element. An array of such sub-masters is assembled together to make a final mold tool. However, fabricating a master is preferred because the master has a monolithic structure and is thus much less susceptible to errors in alignment etc than the sub-masters.

The solid state lens according to the invention can have any number of discrete focal lengths that, in principle, can be switched at any desired switching speed. It will be appreciated that the principle can be extended beyond changes in optical power to switching almost any other optical characteristic, e.g. refractive, diffractive, mirrors, colour filters, polarising optics, dispersive optics (eg. to switch to a spectrometer application on-the-fly), or even Abbe number changes. Furthermore, it is possible to combine two or more devices according to the present invention in series to make lenses that switch between a larger number of focal lengths, or more optical functions such as, for example, a high zoom switchable lens.

The switching mask 1 masks off the areas of the lens 2 that do not contain the required focal lengths. Therefore the light throughput of the lens 2 is reduced because of the introduction of the mask 1. If there are N focal lengths, the average light throughput per focal length is 1/N. Therefore the present device trades light throughput for switching time. However, in many applications, it is more important to achieve better switching time than light throughput. Indeed, many applications are not possible without the fast switching time available, low light throughput being a smaller consideration.

Other lenses according to the invention may have a transmission equal to (N−1)/N, where the transmitted light increases as N increases, although this requires significant image processing to implement. When using an LCD display device as the binary mask 1, a 50% loss is expected from a non-polarised source.

For N=10 focal lengths, the average transmission of each focal length is 10%. An improvement on this implementation is to simultaneously image with two or more focal lengths. One would preferably image with N−1 out of the N optical elements to increase the light throughput and reduce noise.

By successively changing the optical element that is switched off with each frame it is possible to analyse successive frames to determine the contribution from each focal length, but with a much higher signal-to-noise ratio (SNR) because of the larger number of photons transmitted to a camera. Because the mask can be switched very quickly, this successive frame imaging works well in most cases where the image is not substantially changing with time. Further analysis of the images can track fast moving objects and improve the SNR. By introducing a slight colour balance to each discrete focal length (by a mild colour filter), each focal length is effectively colour coded to assist in the software identification process. Fading between one focal length and another with a non-binary mask could also improve the software analysis.

Where post-processing is available, it may be advantageous to have several focal lengths present at once so that the light throughput is increased, with post-processing distinguishing between the two focal lengths present.

Figure 2A:
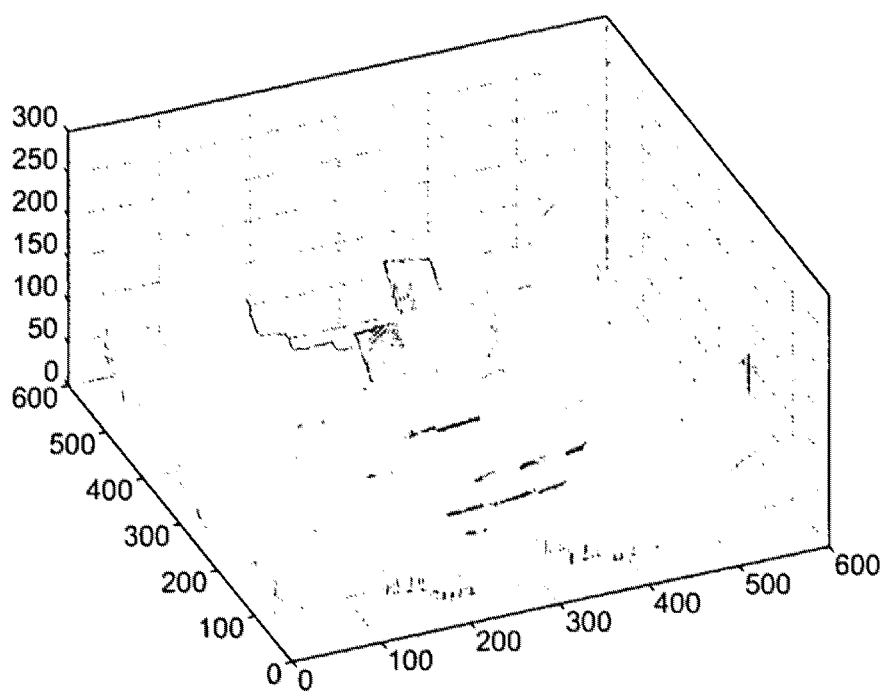
FIG. 2A shows a lens profile corresponding to each focal length of a device according to the present invention.
Figure 2B:
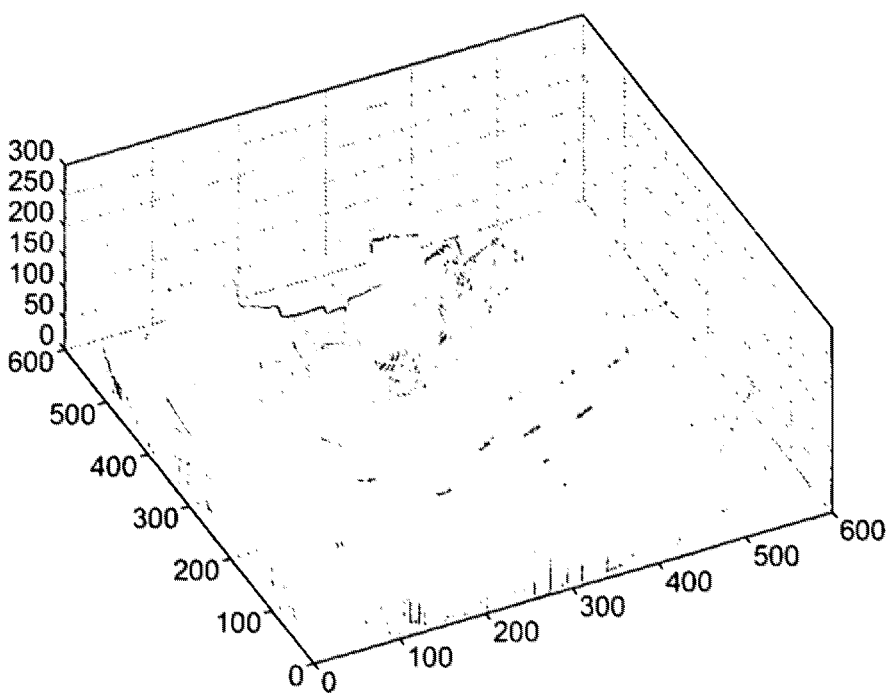
FIG. 2B shows another lens profile corresponding to each focal length of a device according to the present invention.

FIG. 2 shows profiles of sub-areas corresponding to sections of ideal lenses according to the invention. FIG. 2A shows the lens profile corresponding to each focal length of a 10×10 sub-area lens containing four different focal lengths. If a thinner, easier to manufacture lens is required, the lens profile can be flattened to produce a Fresnel type lens structure, as shown in FIG. 2B. FIG. 2B shows the same optical arrangement of FIG. 2A, but constructed as a Fresnel type structure. The lenslet positions in FIGS. 2A and 2B are not arranged in a non-redundant fashion and are just for illustrative purposes.

Preferably, many sub-elements of the same lens function (same focal length or same colour, for example) are arranged across the lens aperture in a non-redundant fashion. Non-redundant arrays, also employed for example in astronomical radio telescopes are designed to maximise information collection and thus image quality, for the surface area an number of apertures available. Preferably, the lens element 2 is placed in the pupil plane.

The switching speed of the lens is limited by the switching speed of the mask 1, which in modern LCD devices is of the order of <5 ms, thus a switching speed above 200 Hz is available. The switching mask 1 has a relatively low resolution therefore the data rates for this mask are very small. The rapid switching is highly compatible with recent low-cost high-frame rate cameras using "temporal pixel multiplexing".

The multi-facetted lens according to the invention has several advantages:

Firstly, the switching speed is only limited by the mask switching speed (potentially >5 kHz with ferroelectric LCs). Secondly, an arbitrary number of focal lengths available and the device is not restricted to a particular range of focal lengths (e.g. one could have f=+10 mm, f=−5 mm, and f=+1000 mm present in same device). Another advantage is the non-sequential addressing of focal lengths i.e. one can address any focal length at any time, not being limited to a progression in a physical characteristic—such as fluid flow. Furthermore, by adjusting the mask accordingly, one can address multiple focal lengths at any time. This is a very important property for increasing the optical transmission.

In the present device, every length element can be individually tailored, therefore aspherics or Fresnel-type elements may be easily used to reduce lens thickness.

Figure 3:
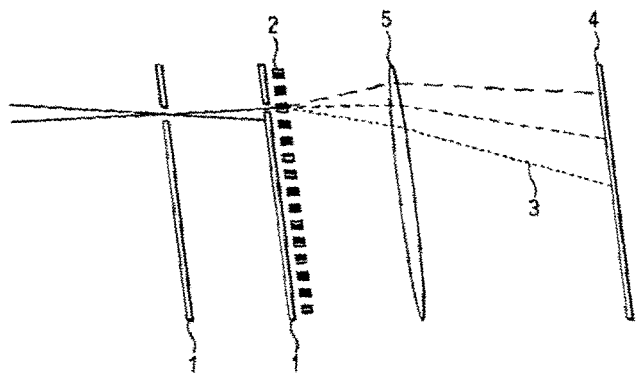
FIG. 3 shows a schematic side view of a system comprising a device according to the present invention.

Using highly dispersive elements 2 according to the invention it is possible to construct a spatially resolving spectroscope (FIG. 3) such that imaging and spectroscopy may be achieved with a single lens. In this example, two binary masks 1 and a multi-facetted lens 2 are employed for spectroscopic analysis of user-selected parts the image. Switching between refractive and diffractive optical elements 2 allows for either an image to be formed, or spectral information 3 about the image to formed on the same CCD 4. The spectral information 3 is schematically represented in FIG. 3 through three rays representing a spectrum. A relay lens 5 may be used to focus the spectrum on the CCD.

Chromatic aberrations in the lens may be corrected by combining colour filter elements 2 with optical power elements 2. Applications exploiting this property include fast multi-spectral imaging systems and cheaper conventional lenses, as will be described in more detail below.

There are a vast number of further applications for a high-speed switching optical device according to the invention. In particular, the following applications offer high potential:

Firstly, 3D imaging may be achieved using a single camera. The scenes may be reconstructed in 3D using the focal lengths within each frame and appropriate analysis software. Combined with low-cost high-speed cameras, 3D scenes may be recorded at 25 Hz frame rates. 3D imaging is desirable for example in surgical applications or 3D microscopy. Furthermore, 3D imaging reduces the need for two expensive cameras at fixed separations when filming 3D television and films, since one relatively low cost device as described above provides the 3D information required by the software to reconstruct the high resolution images from an expensive camera.

Secondly, true 3D projection systems are envisaged. 3D display spectacles are required to project a virtual environment in 3D by 'slicing up' pictures in depth and presenting them at high speed at the appropriate divergence to the eye. This requires modulating the focal length in the projection system (or modulating the source position) at high speed. Therefore, the high-speed solid state device according to the present invention would be extremely well suited for this application.

Conventional 3D spectacles/goggles project 2D images of two different viewpoints into the eyes of the observer to recreate a binocular effect. This technique is used in 3D cinema, typically using two images of different polarisation reflected from the screen and passing through polarisers provided in the spectacles. Therefore the 3D spectacles serve to pass the correct images to each eye.

Such systems however suffer from the major drawback that users find it a strain to use the spectacles for long periods of time. This is because the users' eyes perceive the depth information from the relative displacements of the two images, and point their eyes towards the point in space where the two images converge or the vergence distance. However, to produce a sharp image the user must focus at the position of the screen (the focal distance), which is almost always different from the position of the apparent image. Thus the direction of the eyes and the focussing of the eyes are in conflict, which can cause nausea or headache.

Furthermore, the use of polarising spectacles is undesirable because of the reduction in light throughput of at least 50%, whereas conventional spectacles are above 90% transmissive. Projecting 2D images into the eye has so far been achieved in relatively bulky optical arrangements (which are more accurately called goggles), and suffer from the same problems of two 2D images representing a 3D environment.

A solution to the problem of the conflict between vergence and focus distances is to present a virtual environment to the user where the objects in the images exist at the correct depths. This can be achieved by a volumetric display, where a 3D environment is sliced up into depth planes of 2D information which is presented to the user at the correct virtual distance at a fast enough rate so as not to notice the sequence of images.

To present a number of 2D images at the correct distance to make a 3D volumetric display one needs to rapidly change the focal position of the object. This can be done in a variety of ways, including moving projection lenses, moving the source image, deformable mirrors etc. However, the speeds of movement (typically above 100 Hz, ideally above 200 Hz) lead to vibrating masses at such rates being difficult to implement. Using a high speed multi-switchable solid state lens may be used to overcome these limitations.

Furthermore, the present device may be employed in low cost 3D surveying of buildings or objects, eliminating the need for a laser scanning device. Another application includes gesture/gaming interfaces wherein 3D mapping of human hands or bodies may be achieved at fast frame rates using focus determination.

This application could be extremely useful in biological applications including rapid switching from conventional imaging to spectroscopic monitoring, use of multiple fluorophores with closely matching emission spectra, separable via spectroscopic monitoring, or monitoring evolution of fluorophores with time.

The method is to spatially filter the image using a (binary) LC mask in an image plane to isolate the area(s) of interest to the spectroscopy. The light is then passed through another binary mask which switches between zero optical power areas and highly dispersive (diffractive grating) areas. Thus one can switch between imaging and spectroscopic analysis on-the-fly.

Solid state optical zoom may be achieved by using two or more of the devices according to the invention in series. A zoom lens can be formed which can switch between many zoom settings in an instant. Subsequent focussing using the lenses may also be implemented.

Another application of the present invention is image deflection. By using prismatic elements (with or without optical power) one can increase the angular view of the camera and switch between different views without using a motor.

If the lens comprises sub-elements 2 which are colour filters, the colour of the light transmitted through one filter or any combination of them may be changed as fast as the mask 1 can switch between the different light-transmitting sub-elements 2. Preferably, the mask/filters arrangement is located near the pupil plane of the optical system.

Preferably, the colour filters are arranged in a non-redundant array format, so that as many spatial frequencies are transmitted as possible.

Accordingly, applications of the present invention may combine different colour filters with different focal lengths at each sub-element 2, i.e. both a spectral selectivity and power change capability. Advantageously, this reduces chromatic aberrations in a way that circumvents conventional lens design, leading to extended capabilities and/or cost reduction of the optical system. This capability could be very useful in multi-spectral imaging applications, or mass production of the lenses where cost is highly important. Three applications of the switchable colour filter concept are described below.

A first such application is high resolution real-time hyperspectral imaging. Using the optical device of the present invention with visible (Bayer), UV and near-IR filters at the pupil plane (not at the sensor), a camera may be converted to a multi-spectral imaging device, switching the colour filters on and off at high speed as required. Complementary metal-oxide-semiconductor (CMOS) sensors are sensitive to approximately 350-1100 nm, therefore a hyperspectral imaging system may comprise a single lens and maintain its optical performance over the whole spectral range.

Figure 4:
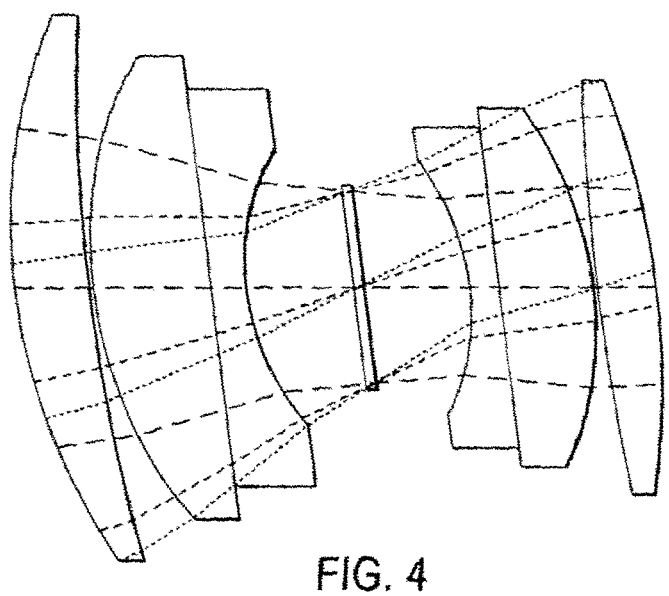
FIG. 4 illustrates an application model, comprising a double Gauss lens with a switchable colour filter at the centre.

FIG. 4 illustrates a model which has been developed to demonstrate this concept and to estimate the number of filters required to maintain an in-focus lens over the 350-1100 nm range. A standard double Gauss lens with a 28 mm focal length has been added a compensating optical power in the pupil plane that changes when different colour filters are used. The pupil plane contains a 1 mm thick LCD switching display with a small optical power chosen to optimise the lens for the spectral range of interest. Advantageously, the optical power in the filter may be used to keep the lens in focus over a very wide spectral range.

Figure 5:
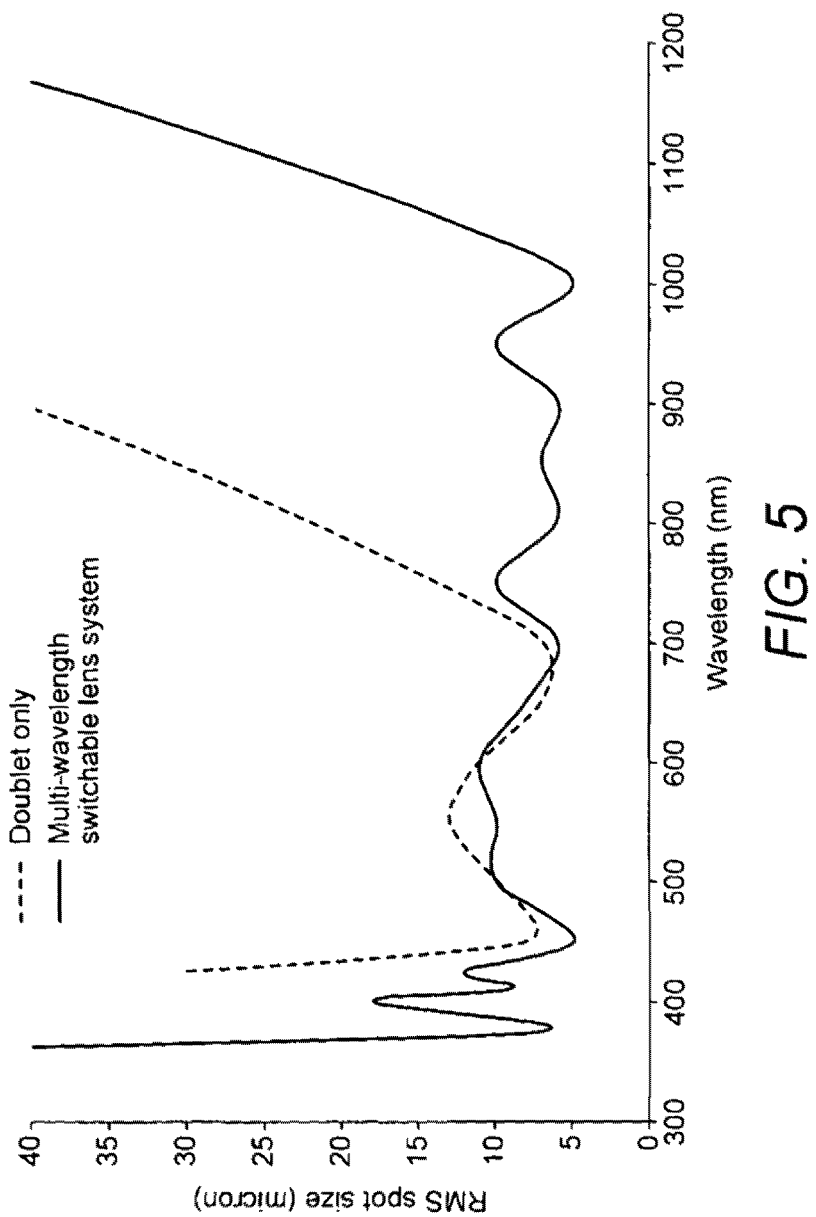
FIG. 5 is a graph showing the performance of a broadband double Gauss lens compared with an identical doublet system with a singlet multi-focal length correction lens.

FIG. 5 is a graph showing the performance of the standard double Gauss lens (indicated by dotted line), and an optical device in accordance with the invention at the pupil plane. As shown in FIG. 5, the spectral range of the lens may be increased from 450-700 nm to 380-1100 nm by the inclusion of 8 filters, including 3 visible filters, 2 UV filters and 3 near-IR filters, without increasing the spot size of the images. The double Gauss lens may be pre-optimised to a 350-900 nm range prior to the inclusion of the filters. The correction required at 1.1 µm is a spherical lens having a focal length of 7000 mm. The higher correction at 350 nm is approximately 960 mm to counteract the high dispersion at UV wavelengths. This highly achromatic lens may be used in high-speed multi-spectral imaging for medical purposes or potentially detection of IR absorbing gases.

A second application involving the use of colour filters is the cost reduction of camera lenses. Conventional camera lenses use doublets to simultaneously correct for colour and geometrical aberrations, however these are typically at least twice as expensive than singlets. An optical device in accordance with the present invention adapted to switch between the different sub-elements (colour filters and optical power) may remove the requirement that the lens itself must correct for the chromatic aberrations, since the sub-elements can be used to correct for this independently. Thus one can remove the doublets from the lens, thereby reducing system costs.

Figure 6:
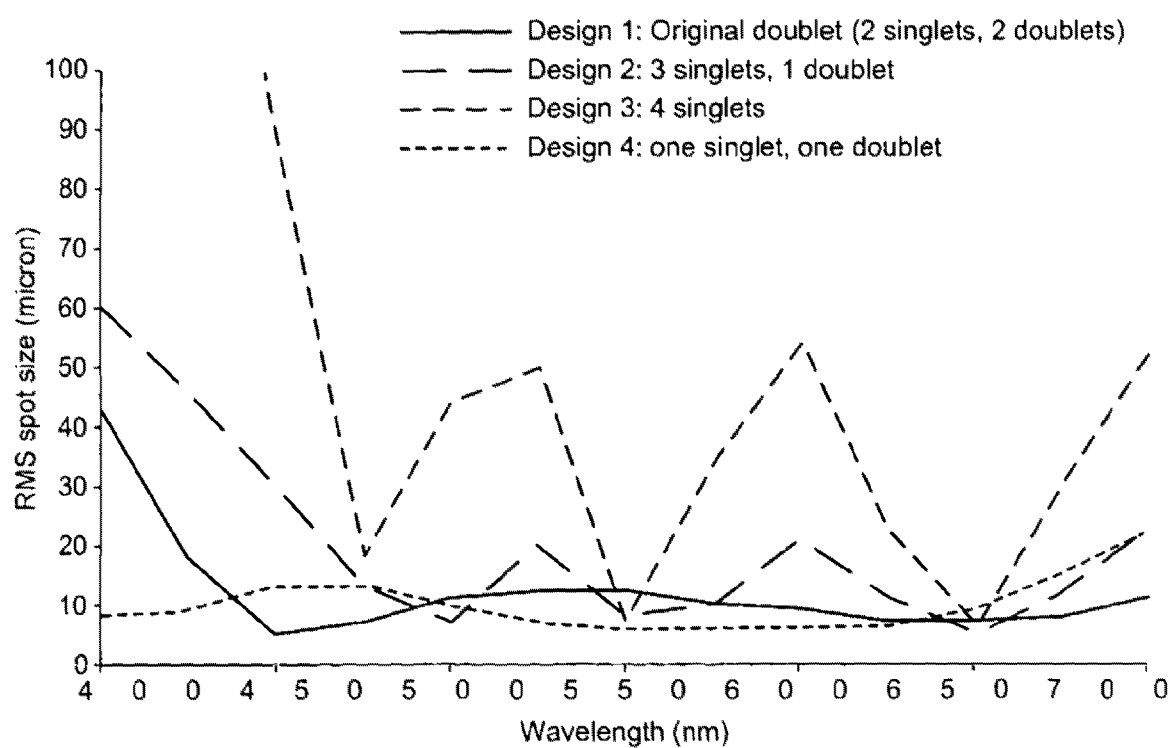
FIG. 6 is a graph showing the performance of four lens system designs with a variable number of singlet and doublet lenses and a compensation multi-focal length lens in accordance with the invention.

Three frames must be taken to obtain a full RGB image. The double Gauss lens of FIG. 5 with RGB filters has been used to determine the extent of cost reduction that could be obtained without significantly compromising the lens performance. FIG. 6 shows the performance of the different lens systems using the switchable filter in accordance with the invention and optical power capability at the stop position. Four designs were analysed and the modelled results are shown in FIG. 6:

Design 1: Standard double Gauss: SD Stop DS
Design 2: 3 singlets (S), one doublet (D): SD Stop SS
Design 3: 4 singlets (S): SS Stop SS
Design 4: one singlet (S) and one doublet (D): S Stop D Three colour filters were used to provide coverage over the visible spectrum. The spot size performance of Design 4 (one singlet and one doublet) is on average the same as the original double Gauss system, but at half the cost.

Figures 7, 8:
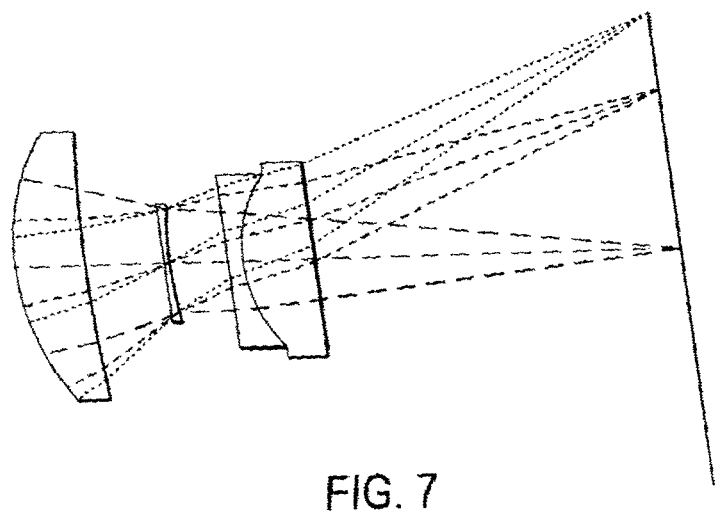
FIG. 7 illustrates an application model, comprising a single and a doublet.
FIG. 8 is a table showing lateral colour dispersion for each of the four system designs of FIG. 6.

In general, removing the doublets increases the chromatic aberrations in the system, leading to much higher sensitivity to wavelength, as can be seen in FIG. 6. However, for a particular singlet and doublet system, the spot size is remarkably insensitive to wavelength, as shown in FIG. 7. Notably, the furthest surface to the right on the doublet shown in FIG. 7 is actually flat, further reducing cost. The switchable filter lens is located at the stop in the middle of the lens shown in FIG. 7.

The original double Gauss lens is well corrected for lateral chromatic aberrations (colour fringing), i.e. displacement of the spot on the sensor as a function of wavelength. The amount of colour fringing of the four systems considered is shown in the table of FIG. 8. Specifically, the table of FIG. 8 indicates the lateral colour dispersion of the 4 designs defined above. Although Design 4 has the lowest chromatic spot size variation, it also has the highest lateral chromatic dispersion. This may be corrected by software to produce a chromatic dispersion free image.

Colour fringing can be removed by software (such technique is becoming standard in imaging systems, e.g. cameras and mobile phones). As indicated in FIG. 8, significant colour fringing is observed for Design 4 however, as indicated above, the spot size over the visible wavelength range is very small, therefore software compensation for the colour fringing is envisaged to work well. This must be considered as an aspect of the whole optical design, as different computational power may be available for different applications. It is estimated that the above-described Designs 1 to 4 may enable system cost reductions of 25-50%.

A third application involving the use of colour filters is colour casting for 3D imaging. By applying a slight colour cast to each sub-element of the same optical power, the contributions from each focus plane can be calculated. This means that 3D information can be calculated from a single image, with many focal planes all occurring at the same time. It will be appreciated that, because many images are superimposed on each other, the dynamic range may be reduced.

The following application relates to an improved optical design that could be achieved by using an optical device in accordance with the present invention. Lens system designs, particularly photographic lens systems designs, involve compromises between many factors such as focal length range, maximum aperture, chromatic aberrations, distortion, size and cost. The component lenses in the optical system are fixed in shape, however they can be moved along the optical axis to chance focal length in a zoom lens design. Accordingly, the optical designer must choose the component lenses such that the best performance compromise is made for the target lens market.

The design described below allows for one or more lenses within the optical design to switch between different lens shapes such that the increased flexibility enables fewer compromises to be made and therefore overall improved optical performance. Advantageously, the designer can choose the most important performance enhancement for the target market.

By way of example only and for the sake of simplicity, a multi-facetted lens with two component lenses of different focal length is considered. The facets of each lens are non-redundantly distributed over the lens area to preserve the maximum information transmission and thus lens sharpness. Ideally, the lens is placed at the pupil plane in the lens where the lens aperture is located, although this is not completely necessary.

The following examples represent applications where the optical device in accordance with the present invention may improve the overall lens performance.

The optical device in accordance with the present invention may be applied to a zoom lens, with two sub-element operating in two regions of the zoom range—macro and far field. Each of the sub-elements is optimised for use in their respective regions. The designer could then maintain the optical quality and increase the focal length range, or maintain the focal length range and improve the optical quality.

Typically, 50% of the light is lost in the optical device (a further 50% is lost if a polarising switching element is used). By optimising the two sub-elements for the two different focal length ranges, it is possible to increase the maximum aperture of the lens system, thereby allowing more light onto the detector, reducing the impact of the 50% light loss—or even allowing more light in than before. This would be highly desirable from a marketing perspective since a step change in functionality is achieved with very little light lost.

A further application of an optical device in accordance with the present invention is the design of a very fast multi-focal lens. By introducing more than two lens elements, it is possible to produce a lens design that can image many different focal lengths individually or simultaneously in arbitrary combinations. This may be useful for 3D depth of field applications. A compatible camera would have to be used in this application.

The optical device in accordance with the invention can also be used to enable artistic effects, such as Tilt/shift and other effect photography: Some examples of such applications are described below.

For example, a tilted lens may be used in miniature faking. Miniature faking is a process in which a photograph of a life-size location or object is made to look like a photograph of a miniature scale model. Available compact cameras such as Canon Powershot SX210, IXUS 210, and IXUS 130 offer a limited software-based effect similar to this. In an SLR this effect can be achieved with an adjustable tilt/shift lens such as, for example, those made by Lensbaby, (http://lensbaby.com/lenses-composer.php).

A shifted lens may be used for correcting perspective, allowing for photographing city-scapes where tall buildings do not show heavily converging lines. Other applications include controlled aberrations for artistic effects, such as soft focus, diffraction halos around light sources. An optical device in accordance with the present invention may also be used as a daylight filter/IR transmitting filters for infrared photography.

The invention claimed is:
1. A light modulation device comprising:
an optical element; and
at least one addressable mask disposed adjacent to the optical element,
wherein the optical element comprises at least two sub-elements, each of the at least two sub-elements having at least one optical characteristic wherein at least one optical characteristic of one sub-element is discrete from at least one optical characteristic of another sub-element, and the at least two sub-elements are in optical communication such that the light transmitting sub-elements have a common optical axis, and wherein the mask comprises at least two regions corresponding to the at least two sub-elements, each of the at least two regions being individually addressable, in use, to enable its corresponding sub-element to be light transmitting.

2. The device according to claim 1, wherein at least one optical characteristic is a focal length.

3. The device according to claim 2, wherein, in use, all light-transmitting sub-elements have equal focal lengths.

4. The device according to claim 2, wherein each focal length is different from another focal length.

5. The device according to claim 1, wherein the mask is a binary on/off mask.

6. The device according to claim 1, wherein the mask is a grey-scale mask.

7. The device according to claim 1, wherein at least one sub-element is passive.

8. The device according to claim 1, wherein at least one sub-element is active.

9. The optical device according to claim 1, wherein at least one sub-element is one of a refractive, a diffractive, a spectrally variable, an optical coating, a reflective, a polarising, and a polarisation changing element.

10. The device according to claim 1, wherein the at least two sub-elements are coloured such that at least one of the sub-elements has a colour different from the colour of another sub-element.

11. The device according to claim 1, wherein the at least two sub-elements form a non-redundant array.

12. The device according to claim 1, wherein the at least two sub-elements are arranged in series.

13. The device according to claim 1, wherein the optical device is included in a spatially resolving spectroscope, and wherein the device comprises two binary on/off masks, at least one refractive sub-element and at least one diffractive sub-element.

14. The device according to claim 1, wherein the device is included in a 3D imaging device.

15. The device according to claim 1, wherein the device is included in a 3D projection system.

16. The device according to claim 1, wherein the device is included in a 3D surveying system.

17. The device according to claim 1, wherein the device is included in a gaming interface system.

18. The device according to claim 1, wherein a first one of the at least two sub-elements transmit light along the common optical axis when a second one of the at least two sub-elements do not transmit light when blocked by a first portion of the at least one addressable mask, and wherein the second one of the at least two sub-elements transmit light along the common optical axis when the first one of the at least two sub-elements do not transmit light when blocked by a second portion of the at least one addressable mask.

19. A light modulation method comprising the steps of:
directing light through an optical element comprising at least two sub-elements,
   each of the at least two sub-elements having at least one optical characteristic wherein at least one optical characteristic of one sub-element is discrete from at least one optical characteristic of another sub-element,
   the at least two sub-elements are in optical communication such that the light transmitting sub-elements have a common optical axis,
   wherein an addressable mask is disposed adjacent to the optical element, and
   wherein the mask comprises at least two regions corresponding to the at least two sub-elements; and
individually addressing the at least two regions to enable their corresponding sub-elements to be light transmitting.

20. The device according to claim 1, wherein the at least two sub-elements are arranged in parallel.

21. The light modulation method according to claim 19, further comprising:
addressing a first portion of the at least one addressable mask,
   wherein a first one of the at least two sub-elements transmit the directed light along the common optical axis, and
   wherein a second one of the at least two sub-elements do not transmit light when blocked by the first portion of the at least one addressable mask; and
addressing a second portion of the at least one addressable mask,
   wherein the second one of the at least two sub-elements transmit the directed light along the common optical axis, and
   wherein the second one of the at least two sub-elements transmit light do not transmit light when blocked by the second portion of the at least one addressable mask.

* * * * *